US011420799B2

(12) United States Patent
Olivarez et al.

(10) Patent No.: US 11,420,799 B2
(45) Date of Patent: Aug. 23, 2022

(54) TRIPLE SHOT SHAKER

(71) Applicant: Theodore Olivarez, Jacksonville, FL (US)

(72) Inventors: Theodore Olivarez, Jacksonville, FL (US); Shue Chan, Jacksonville, FL (US)

(*) Notice: Subject to any disclaimer, the term of this patent is extended or adjusted under 35 U.S.C. 154(b) by 137 days.

(21) Appl. No.: 16/592,563

(22) Filed: Oct. 3, 2019

(65) Prior Publication Data

US 2020/0148440 A1     May 14, 2020

Related U.S. Application Data

(63) Continuation-in-part of application No. 15/875,999, filed on Jan. 19, 2018, now abandoned.

(51) Int. Cl.
*A47J 43/27* (2006.01)
*B65D 51/28* (2006.01)
*B65D 25/08* (2006.01)

(52) U.S. Cl.
CPC .......... *B65D 51/2864* (2013.01); *A47J 43/27* (2013.01); *B65D 25/08* (2013.01)

(58) Field of Classification Search
CPC . A47J 43/27; B65D 51/2807; B65D 51/2857; B65D 25/085; B65D 25/087; B65D 81/3211; B65D 51/2864; G01F 11/18; A47G 19/34
See application file for complete search history.

(56) References Cited

U.S. PATENT DOCUMENTS

| 4,691,821 A * | 9/1987 | Hofmann | A47G 19/34 206/216 |
|---|---|---|---|
| 8,376,134 B1 * | 2/2013 | Underwood | B65D 81/3211 206/221 |
| 2006/0226035 A1 * | 10/2006 | Smith | B65D 25/08 206/219 |
| 2012/0074003 A1 * | 3/2012 | Sheehan | B65D 51/2857 206/219 |

FOREIGN PATENT DOCUMENTS

JP     2011016588 A *    1/2011       B65D 81/3211

* cited by examiner

*Primary Examiner* — Daniel J Colilla

(57) ABSTRACT

Shaker will provide users a quicker and more efficient way to take their supplements before, during, and after their workouts. This delivery system will offer them the option to carry all three main supplements at once.

4 Claims, 3 Drawing Sheets

TRIPLE SHOT SHAKER

PRIORITY: CROSS-REFERENCE TO THE RELATED APPLICATION

This application is a continuation in part of the U.S. Utility application Ser. No. 15/875,999 "Triple Shot Shaker" filed on 19 Jan. 2018 and which claims the benefit of and priority to U.S. Provisional application Ser. No. 62/478,527 filed on 29 Mar. 2017. This continuation in part application also claims the benefit of and priority to said application Ser. Nos. 15/875,999 and 62/478,527. The entire contents of application Ser. No. 15/875,999 "Triple Shot Shaker" and the entire contents of application Ser. No. 62/478,527 "Triple Shot Shaker" are hereby incorporated into this document by reference.

BACKGROUND

Field of the Invention

A high quality, premium supplement shaker that provides the athlete with a pre, during, and post workout supplements storage all in one unit in three separate compartments. No other shaker offers compartments that allow you to hold and mix supplements within the same unit. This will eliminate the inconvenience of carrying multiple bottles and supplement tubs to the gym. The container seamlessly seals all three compartments and utilizes a simple compartment spring pin mechanism to release the supplements into the shaker cup as needed. Drinking will be through a spout on the central lid opening.

Description of the Related Art

The art provided shows the breakdown of the shaker.

SUMMARY

A three compartment beverage container lid will be divided into a semi circle and two quarters to encompass the supplements that most athletes routinely use. It provides a complete and convenient method of containing pre/during/past workout training supplements in dry form all in one storage area to eliminate the inconvenience of carrying multiple containers. Rather than having to try to scoop it out of a single compartment, our shaker will allow the user to just add all their mixes in the one setting and as they need it, all they will have to do is pull the spring loaded pin to release the power mix of their choice. This will cause the mix to empty into the cup compartment below.

DETAILED DESCRIPTION

Reference is made herein to the attached drawings. The figures are intended for representative purposes only and should not be considered to be limiting in any respect.

Figure 1:
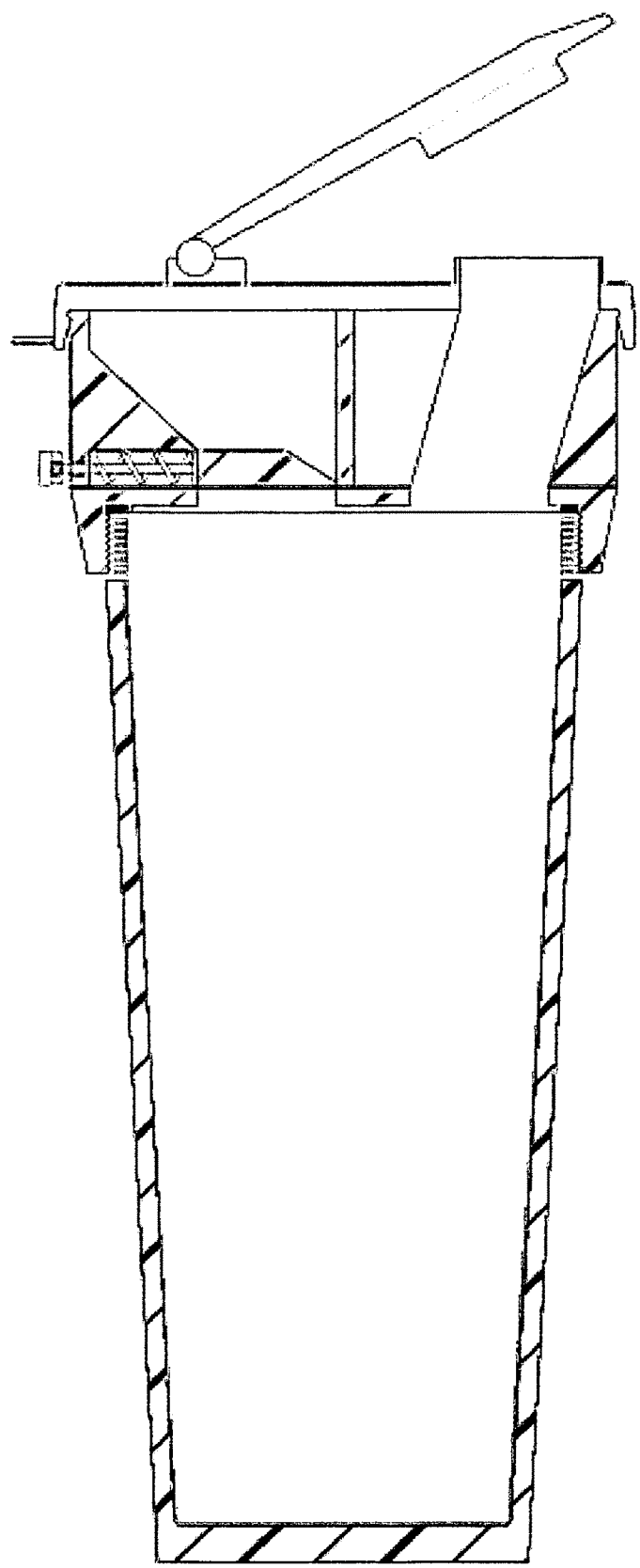
FIG. 1 is a transparent overview of the shaker.

Referring now to FIG. 1, this displays the side of the shaker. There will be markings on the side to allow the user to measure.

Figure 2:
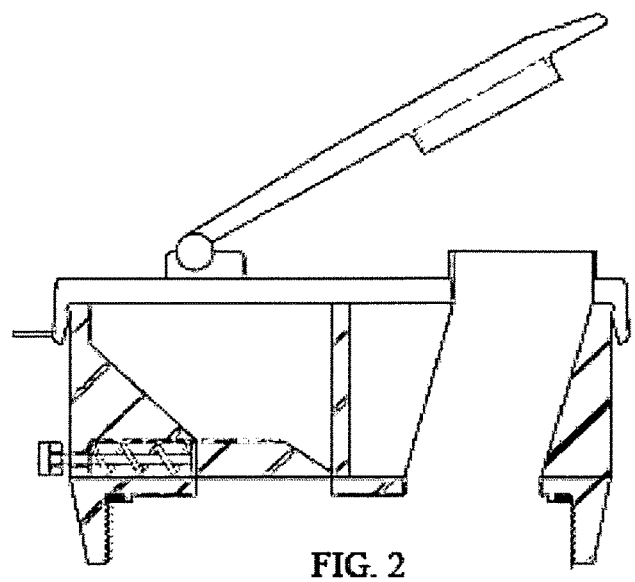
FIG. 2 displays a close up, transparent top view of the lid. Here you can see the three compartments that will store supplements for the user as well as a spout to drink from. The compartments will be open by the pull of the spring-loaded pins also shown in this picture. There is a rubber seal to prevent leaks.
Figure 3:
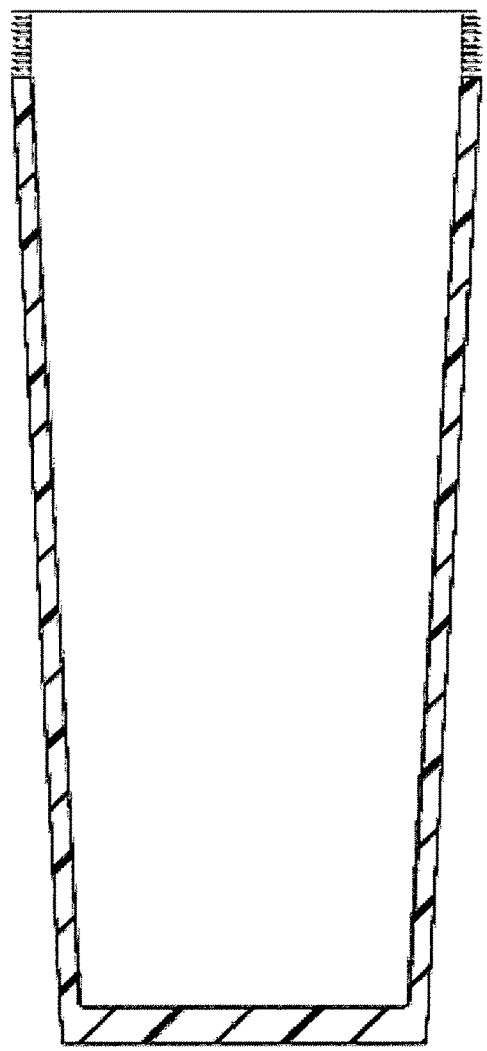
FIG. 3 is a transparent view of the bottom the shaker.

FIG. 2 displays a transparent view from the side. FIG. 3 displays a close up, transparent top view of the lid. It also shows the lid to the top opening and the spout for drinking extending to the bottom of the lid.

Figure 4:
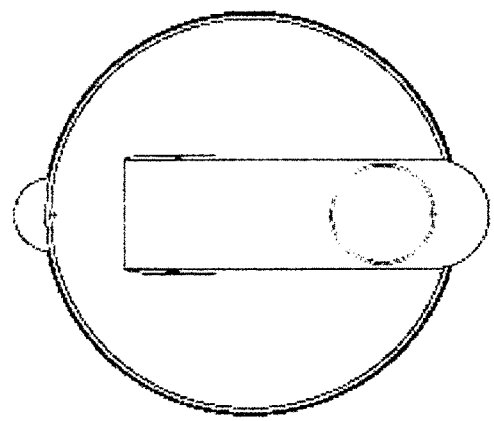
FIG. 4 is the top closed view of the lid to the shaker.

FIG. 4 shows the top of the lid, which has the drinking spout that can be closed during travel.

Figure 5:
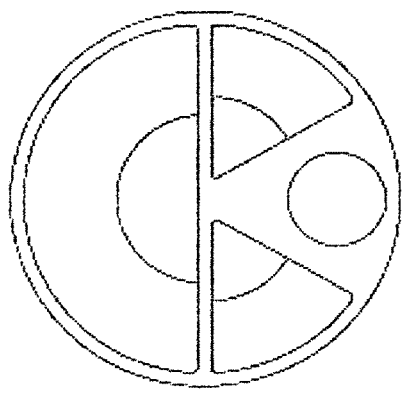
FIG. 5 is a transparent view of the inside of the lid.

FIG. 5, here you can see the three compartments that will store supplements for the user as well as a spout to drink from. The compartments will be open by the slide of the pins also shown in FIG. 6. There is a rubber gasket seal to prevent teaks as well.

Figure 7:
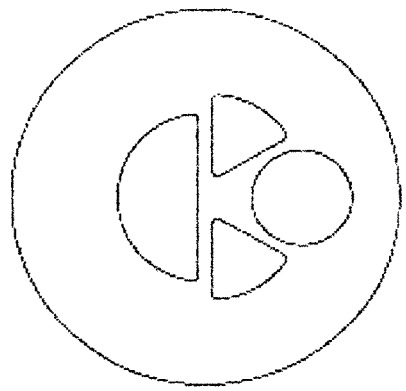
FIG. 7 is a transparent view of the bottom of the shaker lid.
Figure 6:
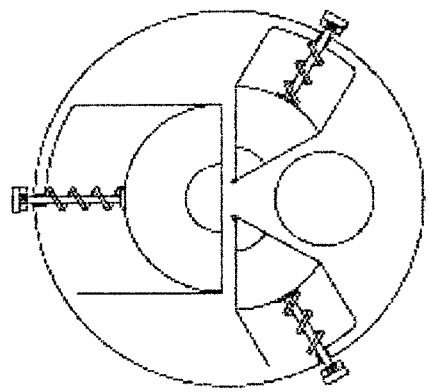
FIG. 6 shows how the pin mechanism will work.

FIG. 7 shows the underside of the lid from where the powder supplements will drop into the water below for the user to then shake and mix once the pins from FIG. 6 is pulled.

The user will fill the shaker lid compartments with the supplements they desire. They will also fill the shaker or lower portion with water. To mix the supplement they desire, the user will simply activate for that compartment causing the dry supplement to fall into the water. The user will no longer need to carry multiple bottles or supplement containers as now it will be housed in one unit.

Figure 8:
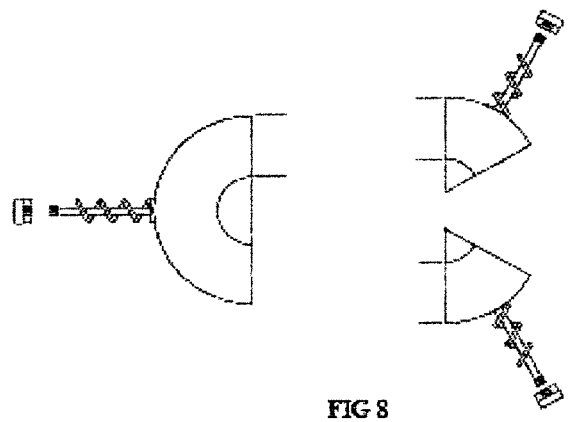
FIG. 8 is a breakdown of the pin mechanism.

FIG. 8 is a breakdown of the pins mechanism.

The above is to be considered as an illustration of the principles of the invention. Since modifications and changes may occur, the drawings are not intended to limit the invention to the exact construction and operation described.

The invention claimed is:

1. An apparatus for mixing a powder into a liquid comprising:
   a lower part housing, wherein the housing is configured to hold a liquid; and
   a lid releasably attached to the top of the lower part housing, said lid including:
   a drinking spout defining a passage from a bottom of the lid to a top of the lid;
   a closure operable to selectively close the drinking spout; and
   multiple compartments configured to store powder, wherein each compartment includes:
     a respective opening in the bottom of the lid;
     a slider mechanism configured to selectively cover a respective opening in a respective compartment; and
     a spring-loaded pin that extends from the outside of the lid into the inside of the lid, each said pin being attached to a respective slider mechanism,
   wherein pulling on one of said spring-loaded pins slides a respective slider mechanism to an open position thereby allowing a powder stored in a respective compartment to fall into the lower part housing, whereby a user can shake the lower part housing thereby mixing the fallen powder with any liquid stored in the lower part housing.

2. The apparatus for mixing a powder into a liquid, according to claim 1, wherein the multiple compartments comprise three compartments.

3. The apparatus for mixing a powder into a liquid, according to claim 2, wherein the three compartments include two small compartments that are the same size and one large compartment that is larger than the two small compartments.

4. The apparatus for mixing a powder into a liquid, according to claim 3, wherein the slider mechanism in the large compartment is shaped as a semicircle and the slider in each of the two small compartments is substantially shaped as a triangle.

\* \* \* \* \*